United States Patent [19]
Sommer

[11] 3,834,502
[45] Sept. 10, 1974

[54] VARIABLE SPEED DRIVE WITH ELECTRONIC CONTROL MEANS

[75] Inventor: Gordon M. Sommer, Grosse Pointe, Mich.

[73] Assignee: G. M. Sommer Co., Inc., Detroit, Mich.

[22] Filed: Sept. 22, 1972

[21] Appl. No.: 291,216

[52] U.S. Cl. ......... 192/104 F, 192/12 C, 192/18 A, 192/58 C, 192/103 F, 192/105 R, 192/113 B
[51] Int. Cl. ... F16d 43/24, F16d 13/72, F16d 67/04
[58] Field of Search ......... 192/104 F, 103 F, 105 F, 192/12 C, 18 A, 113 B, 58 B, 58 C; 137/85

[56] References Cited
UNITED STATES PATENTS

| | | | |
|---|---|---|---|
| 2,995,957 | 8/1961 | Wilson | 192/103 F X |
| 3,384,102 | 5/1968 | Hickox | 137/85 |
| 3,437,188 | 4/1969 | Long | 192/104 F X |
| 3,548,987 | 12/1970 | Erickson et al. | 192/104 F |
| 3,653,476 | 4/1972 | Allen et al. | 192/104 F |
| 3,713,517 | 1/1973 | Sommer | 192/18 A |

*Primary Examiner*—Samuel Scott
*Assistant Examiner*—Lance W. Chandler
*Attorney, Agent, or Firm*—Harness, Dickey & Pierce

[57] ABSTRACT

A variable speed drive comprising a clutch-brake unit having aligned input and output shafts rotatably supported in a housing and including clutch and brake disc stacks located in a liquid reservoir defined by the housing, and selectively engageable through actuation of a hydraulically operable piston. The loading pressure of the clutch disc stack is selectively modulated to provide a variable rotary speed to the output shaft by a control system which includes an electrically operable valve for controlling the piston, and a control module which provides a variable output signal to the valve in response to a selected rotary motion preset in the control module. In one application of the drive, the rotary motion of the output shaft is converted to bi-directional linear motion by the addition of a fixed displacement pump and a four-way valve.

13 Claims, 7 Drawing Figures

VARIABLE SPEED DRIVE WITH ELECTRONIC CONTROL MEANS

BACKGROUND AND SUMMARY OF THE INVENTION

This invention relates generally to variable speed transmissions, and more particularly to a transmission which operates on an oil shear principle wherein torque is transmitted from an input to an output shaft via an oil film disposed on a series of interleaved discs, and wherein the rotary motion of the output shaft is controlled by varying the pressure loading between the discs.

In the subject invention, the pressure loading of a clutch disc stack is selectively modulated by a control system which includes a control module providing a variable output signal in response to a preset rotary motion desired for the output shaft, and a servo relief valve responsive to the output signal. The valve functions as a positioner to suitably locate a hydraulically actuated piston carried in an outer housing of the drive and connected to a movable thrust plate adapted for pressure loading of the disc stack. A pulse gear is mounted on the output shaft and a magnetic pickup is provided to sense the angular motion of the gear. The pickup provides a feedback signal to the control module for error comparison with the preset motion, and the module adjusts the output signal in response therewith. It is therefore a primary object of the subject invention to provide a new and improved variable speed drive which is responsive to a control system for selectively modulating the pressure loading of a clutch disc stack to provide accurate preset rotary motion to an output shaft.

In the subject invention a hydraulic pump is mounted on the unit housing and drivingly connected to the input shaft. The pump provides a source of pressurized fluid to a hydraulic fluid circuit which includes the servo valve and the piston. It is therefore another object of the subject invention to provide a variable speed drive having an integral source of pressurized fluid.

In one form of the subject invention, the input shaft is formed as a tubular shaped sleeve having an outer end portion substantially coplanar with the outer end of the housing. The output shaft of a drive motor extends inwardly within the bore of a sleeve and provides a close coupled interconnection therewith. The result is a motor and variable speed drive unit combined in a single unitized assembly. In another form of the drive, an input shaft extension is provided which allows the drive to be laterally or longitudinally spaced from the drive motor. It is therefore a further object of the subject invention to provide a versatile variable speed drive which may be either close coupled or spaced from an associated drive motor.

In still another aspect of the subject invention, it will be appreciated that a variable speed drive of the above character is subject to a substantial heat load created by frictional movement and slippage of the disc pack. In the subject invention the hydraulic flow from the servo valve is directed through the disc stack to not only maintain the viscous shear between the discs, but also to effect a heat transfer outwardly from the stack towards the housing. A fan mounted to the input shaft provides a high volume of circulated air across the housing to dissipate the heat to the atmosphere. Also, an integral water jacket is built into the housing for supplementing the air cooling if required. It is therefore still another object of the subject invention to provide an air cooled variable speed drive which may be easily supplemented with water cooling if required.

In one application of the subject invention, the rotary motion of the output shaft is adapted to be converted to bi-directional linear motion to a reciprocating piston by drivingly connecting a fixed displacement pump to the output shaft and installing a four-way valve on the discharge side thereof, for selectively pressurizing opposite ends of a double acting cylinder. Additionally, the control module can be programmed to provide acceleration-deceleration control to the piston to suit an individual application. It is therefore a further object of the subject invention to provide a variable speed drive adapted to convert rotary motion to bi-directional linear motion.

In still another aspect of the subject invention, since the subject variable speed drive unit includes both a clutch and a brake, it is readily adaptable for jogging applications of machine tools. In the event heavy workpieces are involved, the control module can be programmed for acceleration-deceleration control. Moreover, in applications involving relatively light loads the brake provides low speed control even though the residual drag of the clutch exceeds the driven load. It is therefore still another object of the subject invention to provide a variable speed drive unit having universality of application.

Another important object of the subject invention is to provide a new and improved variable speed drive unit of the above character wherein the clutch and brake are mechanically interlocked whereby when the clutch is engaged, the brake is automatically disengaged, and when the clutch is disengaged, the brake is automatically engaged, which arrangement provides not only a safety feature but also precludes damage that can occur if there were no mechanical interlock between the clutch and the brake.

Further important objects of the subject invention are to provide a new and improved variable speed drive unit of the character described which is simple and compact in design, economical to produce and operate, extremely rugged and maintainence free in operation, and. wherein the input and output shafts are readily adaptable for direct mounting to any type of machine members such as flywheels, gears, sheaves, couplings, sprockets and the like.

Other objects and advantages of the present invention will become apparent from the following detailed description taken in conjunction with the accompanying drawings.

DETAILED DESCRIPTION OF THE PREFERRED EMBODIMENT

Figures 1, 2:
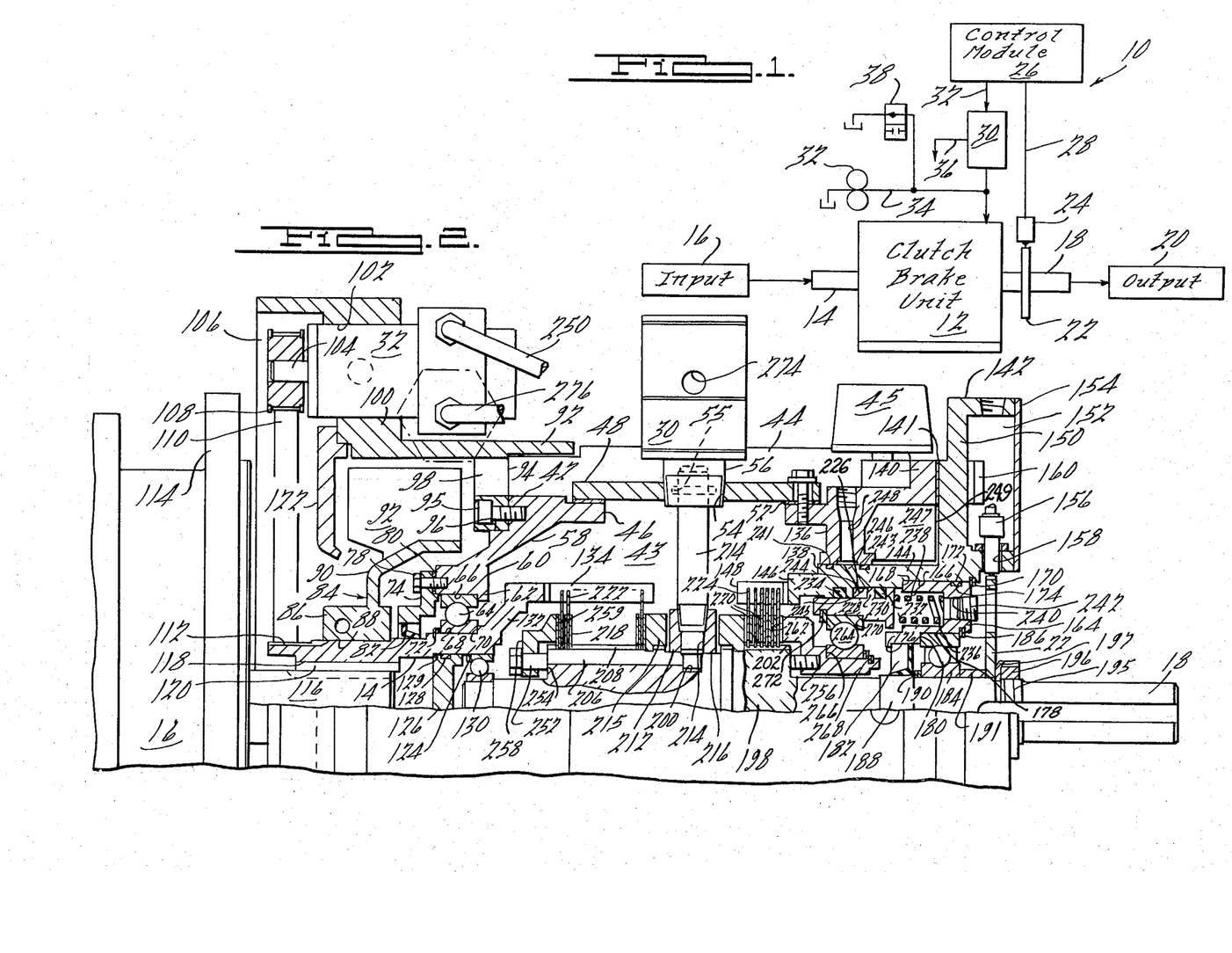
FIG. 1 is a diagrammatic block diagram of the various components comprising the variable speed drive of the subject invention.
FIG. 2 is a fragmentary half cross-sectional elevation of the variable speed drive unit of the subject invention in close coupled relationship with an associated drive motor.

With reference now to FIG. 1 of the drawings, a variable speed drive unit 10, in accordance with a preferred embodiment of the present invention, is shown as comprising a clutch-brake unit 12 having an input shaft 14 drivingly connected to a prime mover 16, such as a constant speed electric motor, and an output shaft 18 drivingly connected to an output load 20. A pulse gear 22 is mounted on the output shaft 18 and a magnetic pickup 24 is provided to sense the rotary motion of the gear 22. As the gear 22 rotates past the pickup 24, a pulse is produced for each tooth. These pulses are transmitted to a control module 26 via a conductor 28 to provide a feedback signal which is electronically compared to the desired rotary motion as may be adjustably preset in the control module 26. In accordance therewith, the control module 26 provides an electrical output signal to a servo valve 30 via a conductor 32, the output signal being adapted to modulate the pressure loading of a clutch or brake disc stack of the unit 12 whereby the desired precise rotary motion to the output shaft 18 is achieved.

The precise details of the control module 26 and the servo valve 30 form no part of the subject invention, but reference may be had to the copending application of Gordon M. Sommer entitled "Control System for Variable Speed Drive," Ser. No. 281,218 filed Sept. 22, 1972, and assigned to the assignee of the subject invention. For use with the variable speed drive unit 10, the servo valve 30 is of the relief type and controls the hydraulic pressure supplied by a pump 32 to an actuating piston (not shown) via a suitable conduit 34. In this regard, the valve 30 selectively pressurizes the piston by discharging hydraulic fluid via a conduit 36 to the clutch disc stack. The exhaust flow from the servo valve 30 provides cooling for the clutch disc stack and maintains the oil shear between the discs as shall hereinafter be described. In the subject invention, the actuating piston is spring loaded to apply the brake disc stack as a "fall safe" feature. As an option, a brake valve 38 can be provided to relieve the pressure on the working side of the piston so that the full spring force can be utilized to apply the brake.

With reference now to the details of the clutch-brake unit 12, and as best seen in FIG. 2, the unit 12 is shown as comprising a generally cylindrically shaped housing 42 having a plurality of longitudinal, outwardly extending ribs or fins 44 and including a relatively large access opening 46 which is normally closed by a valve mountin plate 48, the latter being secured by suitable screws, bolts, or the like 50 and sealed by a fluid tight gasket 52. An exhaust port 56 of the servo valve 30 is mounted in a threaded aperture 54 formed in the plate 48, and is adapted to discharge hydraulic fluid into a reservoir 43 defined interiorly of the housing 42. For convenience in initially filling the reservoir 43 with a hydraulic fluid, a removable breather cap 45 is provided to the right of the plate 48 as viewed in FIG. 2.

An angularly extending integral end wall portion 58 is disposed at the left end of the main housing 42 and includes an integral, longitudinally extending, support section 60. The section 60 has a central cylindrically shaped, opening 66 through which the input shaft 14 extends. The shaft 14 is rotatably supported by a bearing assembly 64 which includes an outer race located in the opening 66 and an inner race on an outer peripheral section 68 of the shaft 14. The inner race is seated against a radially extending shoulder 70 formed at the right end of the section 68 and retained thereagainst by a suitable retaining ring or the like 72. The outer race is located against an inwardly projecting lip 62 and retained thereagainst by a seal ring, generally designated 74. The ring 74 is connected to an outer face of the section 60 by suitable screws, bolts, or the like, generally designated 78, and including a suitable fluid sealing gasket means 80 therebetween. The ring 74 also carries a suitable fluid tight oil seal or the like 82 which is located against the outer periphery of the shaft 14 and a suitable, forced air, fan assembly, generally designated 84, is mounted on the outer end of the input shaft 14 exteriorly of the seal ring 74, and includes a central annular collar section 86 having a central opening 88 within which the outer end of the input shaft 14 is received and fixedly connected. The assembly 84 may further comprise radially outwardly and longitudinally extending fan blade support means 90 adapted to carry a plurality of air circulating fan blades, generally designated 92. As will be apparent, rotation of the input shaft 14 will result in simultaneous rotation of the assembly 84, whereby the fan blades 92 will circulate cooling air across the main housing 42. A suitable fan housing or shroud 92 is provided adjacent the assembly 84 to direct the flow of air circulated thereby across the outer peripheral surface of the main housing 42. As shown, the shroud has a generally radially inwardly extending section 94 adapted to be secured by suitable screws, bolts, or the like 95 to an annular shaped recess 96 formed at the left end of the main housing 42. The section 94 includes a plurality of axially extending openings 98 wherethrough the cooling air is directed. The shroud 92 further includes an outwardly, radially extending section 100 having an opening 102 adapted to receive and secure the hydraulic pump 32.

As indicated previously, the hydraulic pump 32 provides a source of pressurized fluid to the servo valve 30, and to a hydraulically actuated piston to be hereinafter described. Preferably, the pump 32 is a bi-directional pump which may be operated in either the clockwise or the counterclockwise direction, and includes an input shaft 104 carrying a pulley 106. The pulley 106 includes a plurality of circumferentially spaced teeth 108 adapted for engagement with a timing belt 110 for drivingly interconnecting the pulley 106 to the input shaft 14, the latter being provided with a spline formation 112 adapted for driving the belt 110.

As indicated previously, the clutch-brake unit 12 of the subject invention is adapted to be connected in close coupled relationship to an associated drive motor, indicated generally at 16. The motor 16 includes an outward, radially extending, mounting flange 114 and an output shaft 116. The shaft 116 engages an axially extending bore 118 formed in the input shaft 14 and is drivingly connected thereto by a key member 120. The unit 12 is connected to the motor 16 via a motor mounting adapter member 122, the member 122 being interconnected to the shroud 92 and the mounting flange 114 by bolts, screws, or the like (not shown) and as is conventional in the art.

The bore 118 of the input shaft 14 is closed proximate its inward end by a disc-shaped plug 126 carryin an O-ring 128 in its outer peripheral surface and located against an annular shoulder 129 formed by a counterbore 124. Also located in the counterbore 124 of the shaft 14 is a bearing assembly 130 which rotatably supports the inwardly extending end of the output shaft 18. The input shaft 14 further includes a radially enlarged, lug supporting section 132 which extends angularly outward from the bearing assembly 130 and integrally supports a plurality of axially extending lugs 134 which are adapted to slidably support a series of clutch friction plates 222 which shall hereinafter be described.

The right end of the main housing 42 has an inwardly extending radial flange 136 disposed slightly inwardly from the outer axial end thereof and defines an inner peripheral, cylindrically shaped, opening 138. An outward radially extending flange 140 is formed at the extreme right end of the housing 42 and connected by a fluid tight gasket means 141 and a plurality of suitable screws, bolts, or the like (not shown) to an end housing member 142. The member 142 is comprised of an axially extending hub section 144 including a lug supporting portion 146 carrying a plurality of integral axially extending lugs 148. The lugs 148 are adapted to slidably receive a series of brake friction plates 224 which will hereinafter be described. The end housing member 142 also includes a radially extending flange section 150, having an enlarged, laterally extending foot 143 (see FIGS. 6 and 7) at a lower end for suitably mounting the unit 12, and an integral conduit box 152 formed at an upper end, the latter being suitably closed by a removable cover plate 154. A magnetic pickup assembly 156 is engaged in a threaded bore 158 disposed in the lower end of the box 152 and a multi-sectioned terminal strip 160 is supported on an inner wall thereof for connecting suitable electrical conductors to the servo valve 30, the brake valve 38, is used, the magnetic pickup assembly 156, the control module 26.

A generally annular shaped bearing housing 164 is located in a cylindrical passage 166 formed in the right end of the member 142 and retained against a radially extending shoulder 168 formed at an inward end of the passage 166 by a retainer ring 170. The housing 164 is sealed in the passage 166 by a fluid tight O-ring 172 located in the groove 174 formed on the outer periphery thereof. First and second cylindrical shaped passages, indicated at 176 and 178 respectively, are formed in the inner periphery of the housing 164 and define a radially extending shoulder 180 therebetween. The passage 176 carries a suitable oil seal member 182, and a bearing assembly 184 for rotatably supporting an outer end of the output shaft 18 is located in the passage 178, and axially retained against the shoulder 180 by a suitable retaining ring 186. The inner race of the assembly 184 is disposed proximate a slightly enlarged annular section 188 formed on the outer periphery of the output shaft 18 and suitably spaced therefrom by a retainer ring 190. An annularly shaped spacer ring 191 is disposed on the opposite side of the inner race of the assembly 184 and axially locates the pulse gear 22. The gear 22 preferably is cut with a large number of teeth to provide an equivalent large number of pulses to the module 26 per each revolution of the shaft 18. In a preferred form, the gear 22 has 192 teeth thereby providing 192 pulses per revolution of the output shaft 18 to the control module 26 via the magnetic pickup 156. The gear 22 is retained on the output shaft 18 by a locknut 196 engaged to a threaded section 195 formed on the shaft 18.

The opposite end portion of the shaft 18, relative to the locknut 196, is formed with an enlarged diameter section 198 having an external spline formation 202 disposed about its outer periphery, and includes an inward, radially extending, groove or recess 200. The portion of the section 198 to the left of the recess 200 has a plurality of circumferentially spaced, axially extending grooves 206 disposed about the outer periphery thereof, and adapted for communicating the hydrulic liquid through the clutch disc stack for oil shearing and cooling. A relatively stationary, annular shaped, oil ring member 212 is located over the recess 200 and includes a radially extending passage 214 engaged to an inward end of a conduit or nipple 214. The opposite end of the nipple 214 is slidably engaged in an inner peripheral surface of the exhaust port 56 and fluidly sealed therein by an O-ring 55. The nipple 214 functions to direct hydraulic fluid from the port 56 of the valve 30 to the grooves 206 via the recess 200. A pair of annular shaped thrust plates 215 and 216 are connected for rotation with the output shaft 18, and spaced on opposite sides of the member 212. The plates 215 and 216 function as axially stationary pressure plates for use in loading the clutch and brake disc stacks, respectively as shall hereinafter be described.

A first series of clutch friction discs, generally designated 218 having internal spline formations complimentary to the external formations 202 are splined on the formations 202 to the left end of the plate 215, and a second series of brake friction discs, generally designated 220 and identical to the discs 218 are disposed in splined engagement with the formations 202 on the right side of the plate 216.

The series of friction clutch plate members 222 are each provided with a plurality of circumferentially spaced, radially inwardly extending notches adapted for splined engagement with the plurality of longitudinally extending, circumferentially spaced, lugs 134 that are mounted upon the supporting section 132 of the input shaft 14. Preferably, the drive lugs 134 are equally circumferentially spaced, with the friction clutch plate members 222 being formed with a correspondingly located, number of keyed notches. The plate members 222 are each internally bored, with the inner peripheral edges thereof being interposed between the outer peripheral edges of the clutch friction discs 218. Similarly, the series of friction brake plate members 224, are each provided with a plurality of circumferentially spaced notches adapted for splined engagement with the plurality of drive lugs 148 disposed on the end wall member 142. The brake plate members 224 are each centrally bored, with the inner peripheral edges thereof being interposed between the outer peripheral edges of the series of brake friction discs 220 as hereinbefore described.

With reference now to the means for selectively clamping, or pressure loading, the friction discs 218 and 220 with the clutch and brake stacks 222 and 224 respectively, the hub portion 144 of the member 142 has a centrally located, cylindrical passage 226 extending inwardly from the radial shoulder 168. An annular shaped actuating piston member 228 is slidably located in the passage 226 and includes a radially enlarged end portion 230 which carries a suitable O-ring 232 for sealing the right end of the member 228. The left end of the member 228 is correspondingly sealed by an O-ring 234 located in a suitably formed recess formed in an inner peripheral surface of the member 142. The piston member 228 is adapted for reciprocal movement within the passage 226 and is biased longitudinally therein in response to differential forces applied against the opposite sides thereof. More particularly, the piston 228 is adapted to be biased longitudinally towards the interior, or left end, of the housing 42 under the influence of the plurality of circumferentially spaced, longitudinally extending, piston springs 236 that are located one in each of a plurality of longitudinally extending, circumferentially spaced, bores 238 formed in the bearing housing 164. The interior ends of the springs 236 are adapted to bear directly against the outward side of the piston member 228, while the outer ends of the springs 236 are adapted to bear against the inward radial face of the bores 238. For a purpose to be hereinafter described, the inward face of each of the bores 238 has a coaxial threaded passage 240 of a smaller diameter relative to the bore 238 wherein are disposed suitable closure plugs 242. In a preferred construction of the present invention, the clutch-brake unit 12 is provided with ten of the bores 238; each being provided with one of the springs 236.

The space defined between a radial shoulder 244 formed in the inner periphery of the end housing 142 and the inward face of the end portion 230 of the member 228 define a working cylinder 245. The cylinder 245 is communicable through fluid passages 246 and 248, formed respectively in the end housing 142 and main housing 42, and sealed by O-ring members 241 and 243 carried in the outer periphery of the hub section 144. The passages 246 and 248 are in fluid communication with the discharge side of the hydraulic pump 32 via suitable piping or conduit 250. When pressurized hydraulic fluid is communicated via the conduit 250, passage 248, and passage 246 to the working cylinder 245, piston member 228 will be biased longitudinally towards the right against the resistance of the springs 236. Similarly, at such times as the hydraulic fluid pressure within the chamber 245 decreases below a preselected level, the piston member 228 will be biased towards the left by the springs 236.

Mechanical interlock means for either simultaneously, compressively, modulating the loading to the clutch plate members 222 and the friction discs 218 together and relieving the frictional engagement between the brake plate members 224 and the brake friction discs 220, or alternatively for simultaneously relieving the frictional engagement between the clutch plates members 222 and frictional discs 218 and compressing the brake plate members 224 and the brake friction discs 220 together, in response to reciprocal movement of the piston member 228 is achieved through the provision of a plurality of longitudinally extending, circumferentially spaced, bolts generally designated 252 alternatively arranged with an equal number of longitudinally extending, circumferentially spaced, rods (not shown). The bolts 252 and rods are reciprocably, or slidably, disposed one within each of a plurality of longitudinally extending circumferentially spaced bores, generally designated 254 formed in the enlarged diameter section 198 of the output shaft 18. The right end of the plurality of bolts 252 are externally threaded and are adapted to be fixedly secured to an annular brake actuating member 256, while the left end is located in suitable bolt holes formed in an annular clutch actuating member 258. The plurality of rods (not shown), which are alternately arranged with respect to the bolts 252 circumferentially around the shaft 18, are adapted to about at their opposite longitudinal ends against axially adjustable set screws or plugs (not shown) that are threadably mounted within suitably aligned bores formed in the actuating members 256 and 258. The rods act as a spacer means for axially spacing the members 256 and 258, and for controlling the gap or space between the discs 218 and a face 259 formed on the clutch actuating member 258, with the relative axial spacing therebetween being controlled by suitable axial adjustment of the set screws. It will be seen that a unitized assembly is provided by the rods (not shown) and the bolts 252, in that the bolts are subject to exert an axial compressive force upon the members 256 and 258, while the rods (not shown) exert an axially outwardly directed force against the members, whereby to assure any relative rotational, axial or circumferential movement between the members 256 and 258, bolts 252 and rods, upon assembly thereof.

The brake actuating member 256, which includes an engaging face 262, is connected via a suitable antifriction bearing assembly 264 to the piston member 228. In this regard it will be seen that the inner race of the assembly 264 is retained between a shoulder 266 and a retaining ring 268 suitably located on the brake actuating member 256, while the outer race of the assembly 264 is retained between a shoulder 270 and a retaining ring 272 formed on the piston member 228. With this arrangement the members 256 and 258 will move longitudinally within the housing 42 upon longitudinal movement of the piston member 228; however, because of the provision of the anti-friction bearing assembly 264, the members 256 and 258 will be free to rotate about the longitudinal axis of the unit 12 relative to the piston member 228. The radial face 262 of the brake actuating member 256 is cooperable with the side of the brake friction discs 220 for clampingly securing the brake plate members 224 and brake friction discs 220.

The torque transmitting elements within the housing 42, i.e., clutch plates 222, brake plates 224 and clutch friction discs 218 and brake friction discs 220, are located in a bath of hydraulic fluid disposed within the reservoir 43 formed within the housing 42 and supplied by the pump 32 via the exhaust port 56 of the valve 32. The result is that all, or some portion, of the torque of the input shaft is transmitted to the output shaft by viscous shearing of the hydraulic fluid disposed between the various interleaved friction plates and discs. In the case of the clutch plates 222 and discs 218, the pressure is selectively modulated therebetween the plates 222 and discs 218, whereby a controlled slip is achieved by shearing of the fluid between each adjacent plate 222 and disc 218. In the subject drive unit 12, the working cylinder 245 of the actuating piston 228 is directly connected to the discharge side of the pump 32 via the conduit 250. The conduit 250 is connected to the upstream side of the servo valve 30 via a suitable branch connection or conduit (not shown) connected to an inlet port 274 thereof. The suction side of the hydraulic pump 32 is connected to, and in fluid communication with, the underside of the main housing 42 (reservoir 43) via a conduit 276. Thus, it will be seen that hydraulic fluid is withdrawn from the lower side of the main housing 42, through the conduit 276, to the suction side of the pump 32 wherein the pressure of the hydraulic fluid is increased. The fluid is then discharged via the conduit 250 to the inlet side of the servo valve 30 and simultaneously to the working cylinder 245 of the actuating piston 228.

The design of the servo valve 30 is such that it increases or decreases the fluid pressure on the actuation piston 228 in response to increasing or decreasing the magnitude of the output signal from the control module 26. The piston return springs 236 oppose the pressure in the working cylinder 245 and provide a "fail safe" by engaging the brake plates 224 and discs 220 in the absence, or loss, of pressurized hydraulic fluid. Thus, since an increase or decrease of the output signal correspondingly results in a change in the hydraulic pressure in the working cylinder 245, and since the output signal is corrected in accordance with the feed back signal provided by the magnetic pickup 126, the rotational movement of the output shaft 18 is precisely controlled. Moreover, it will be seen that the hydraulic fluid entering the servo valve 30 discharges through the pipe 214, the recess 200, through the axially extending openings 206, and therethrough the clutch disc stack wherein it is viscously sheared by the relative rotary motion between the plates 222 and the discs 218. Thus, while the hydraulic flow is utilized to maintain the viscous shear in the clutch disc stack, it also provides a heat transfer function. Note, that as the hydraulic fluid passes between the plates 222 and discs 218, it is influenced by centrifugal force provided by the rotary movement of the disc stack, and is directed toward the inner periphery of the main housing 42. The heat is here transferred to the atmosphere due to the air cooling of the housing by the fan assembly 84, previously described. If additional cooling is required, a cooling media such as water may be flowed through a water jacket 247 formed at the right end of the main housing 42.

In this regard, it will be seen that the jacket 247 is formed between the flange 136 of the housing 42, and the flange 150 of the end housing 142. The jacket 247 is of generally annular shape and preferably includes a plurality of circumferentially spaced, inwardly extending ribs or fins, one of which is indicated generally at 249, and which serves to increase the surface area of the jacket 247 and thereby increase the heat transfer capability thereof. Corresponding suitable ribs or fins may be disposed in the reservoir 43 to transfer the heat of the hydraulic fluid to the housing 42. Appropriate removable closure plugs may be provided on opposite lateral sides of the housing 42 for connecting the jacket 247 to a suitable source of water, i.e., the plant water system or a suitable water pump. Accordingly, the water discharged therefrom may be returned via a suitable heat exchanger means which also can be common with the plant system.

Assuming initially that the motor 16 is energized, and the brake discs and plates, 224 and 220 respectively are clampingly engaged due to the bias of the coil springs 236. In this condition it will be noted that the input shaft 14 is permitted to rotate freely due to the non-engagement of the clutch disc stack. Rotation of the input shaft due to its driving connection to the hydraulic pump 32 provides a transfer of fluid in the conduit 250 which is substantially discharged by the valve 30. In response to a preselected output signal from the control module 26, the valve 20 provides a variable restriction to the discharge flow whereby the working cylinder 245 is pressurized via fluid communication with the conduit 250 and the passages 248 and 246. Pressurizing the cylinder 245 effects longitudinal sliding motion of the piston member 228 to the right against the bias of the coil springs 236. Accordingly, movement of the piston member 228 to the right also effects simultaneous longitudinal movement of the brake actuating member 256 and the clutch actuating member 258 towards the right thereby accomplishing two functions. First of all, the clutch actuating member 258 compresses, or pressure loads, the clutch disc members 222 and the friction plates 218 between the confronting face 259 of the clutch actuating member 258 against the left radial face of the thrust plate 215. Secondly and simultaneously, the aforesaid longitudinal movement of the brake actuating member 256 causes the face 262 thereof to move longitudinally away from the right radial face of the thrust plate 216 and thereby releases the brake in order to permit free rotation of the output shaft 18. The pressure loading or clamping of the clutch disc stack now provides torque transmission between the input and output shafts 14 and 18, respectively, in response to the control module 26. Simultaneously, the magnetic pickup assembly 156 monitors the pulses provided by the pulse gear 194 rotating with the shaft 18, whereby the output signal from the module 26 is correctively adjusted to provide a magnitude of hydraulic pressure adapted to position the piston member 228 to selectively modulate the pressure loading of the plates 222 and discs 218 whereby the controlled slippage therebetween, will provide a precise rotational movement of the output shaft in response to the control module 26. Also in this regard it will be seen that the entire volumetric output from the pump 32 not required for pressure loading the actuating piston 228 is discharged by the valve 30 to the disc stack to maintain the viscous shear and for transfer of the heat generated thereby. Thus, it will be seen that the variable speed drive 10 of the subject invention is well suited to provide selected variable shaft motion which may be effectively utilized for driving pumps, fans, extruders, mixers, machine tools, etc. or any other application requiring variable speed.

Figures 3, 4:
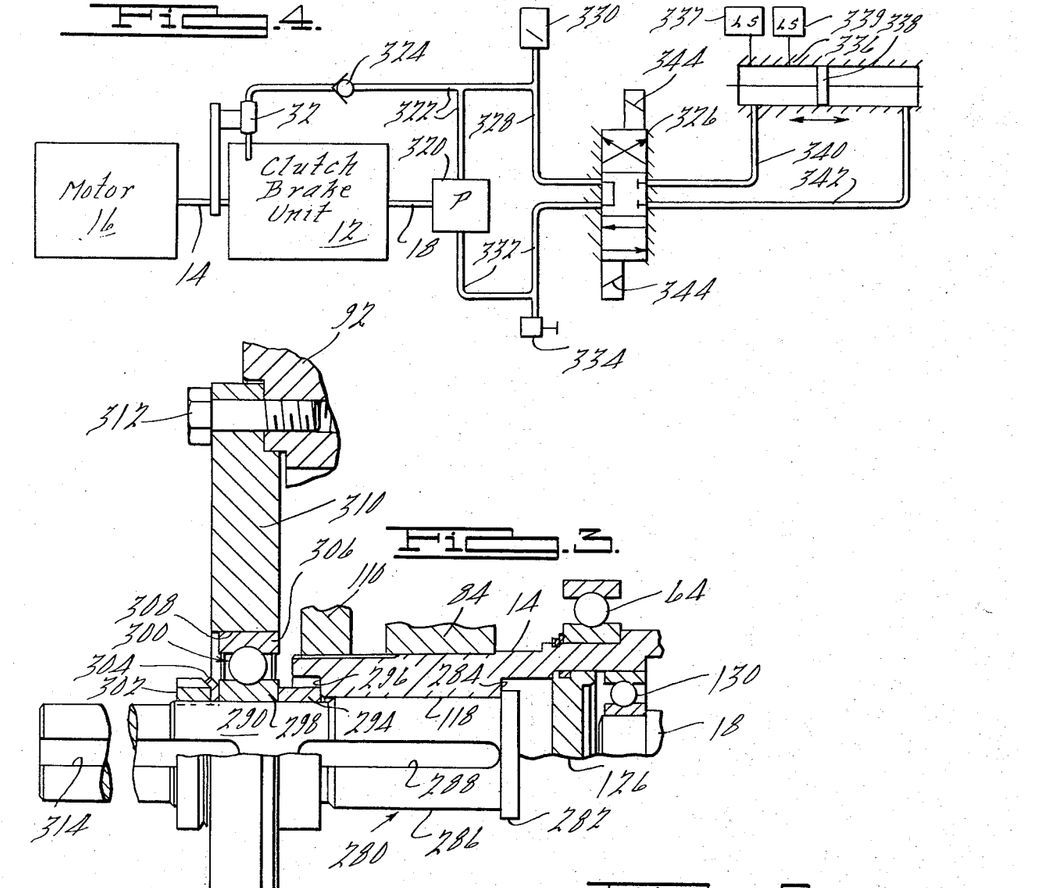
FIG. 3 is a fragmentary cross-sectional plan view of the left end of the variable speed drive unit illustrated in FIG. 2 depicting an alternate input shaft arrangement.
FIG. 4 is a diagrammatic block diagram of the variable speed drive unit illustrated in FIG. 2 depicting the components for converting rotary motion to bi-directional linear motion.

In the previously described embodiment of the subject invention, the input shaft 14 was adapted for close coupling interconnection to an associated drive motor 16. While the above affords an attractive compact package, in some instances it will be desirable to connect the input shaft 14 of the clutch-brake unit 12 to a motor having a drive shaft spaced either longitudinally or laterally therefrom. In FIG. 3, a modified input shaft arrangement is illustrated for adapting the clutch-brake unit 12 for such an application. For purposes of clarity, common components and elements of the clutch-brake unit 12 described in conjunction with FIG. 2 are utilized. With reference then to FIG. 3, a generally cylindrically shaped, input shaft adapter 280 is disposed in the outer end of the input shaft 14 and extends outwardly to the left therefrom. The adapter 280 is formed with an enlarged flange portion 282 at one end which abuts the radial shoulder 284, formed on the inner periphery of the input shaft 14. The adapter 280 is drivingly connected for rotation with the shaft 14 by a key member located in a keyway 288 complimentary with a keyway formed in the inner periphery of the shaft 14. A generally cylindrically shaped support section 290 is formed between opposite ends of the adapter 280. An annular shaped spacer ring 294 is slidably located on the right end of the section 290, as viewed in FIG. 3, and abuts the shoulder 296 formed on the inner periphery of the input shaft 14 to thereby locate an inner race 298 of a bearing assembly 300. The inner race 298 is axially retained against the ring 294 by a locknut 302 and lock washer 304 threadably engaged with the shaft 290. An outer race 306 of the bearing assembly 300 is carried in a coaxial opening 308 of a bearing plate 310, the plate 310 being connected to the shroud 92 by suitable bolts, screws, or the like 312. Preferably the plate 310 has suitable openings or slots (not shown) which are adapted for the passage of inlet air to the fan assembly 84. Thus, input shaft 14 of the clutch brake unit 12 is readily adapted for power transmission from a longitudinally or laterally spaced drive means as by a keyed connection via a suitable keyway 314 to a pulley, sheave, gear, or rotary coupling.

In one application of the subject variable speed drive 10, the controlled rotary motion of the output shaft 18 may be converted to controlled bi-directional linear motion, as for example in reciprocating a piston member in applications employing a double ended cylinder. For such applications the control module 26 may also be programmed to provide acceleration and deceleration control to the piston during selective portions of its stroke, the selected portions being defined by the installation of a limit switch at each point that it is desired to accelerate or decelerate the piston.

An exemplary diagrammatic sketch of the apparatus for converting rotary motion to bi-linear motion is illustrated in FIG. 4. With reference thereto, it will be seen that the motor input shaft 16 is drivingly connected to the clutch-brake unit 12 and to the hydraulic pump 32 in a like manner as described in conjunction with FIG. 2. The output shaft 18 of the clutch-brake unit 12 is connected to a fixed displacement pump 320 which provides pressurized hydraulic fluid to a closed hydraulic loop to be described. Make-up hydraulic fluid is provided to the closed loop by the pump 32 via a conduit 322, the conduit 322 carrying a one-way check valve 324 for preventing a back pressure against the hydraulic pump 32. The conduit 322 is in fluid communication with a four-way valve 326 via a conduit 328, the conduit 328 preferably including a suitable pressure switch 330. The suction side of the fixed displacement pump 320 is connected to the four-way valve 326 by a conduit 332 and to a shut-off valve 334 adapted for use in precharging the closed hydraulic loop. A double ended cylinder, indicated generally at 336, is located on the downstream side of the four-way valve 326 and includes a reciprocating piston member 338. Opposite spaced ends of the double acting cylinder 336 are connected to the four-way valve 326 by suitable conduit means 340 and 342, the conduit 342 providing fluid communication to the right hand side of the piston 338 and the conduit 340 being in fluid communication with the left hand side thereof.

For purposes of illustration assume, for example, that it is desired to accelerate the piston during a first portion of its stroke to a preset speed and at some selected point provide deceleration. By locating a limit switch 339 at the selected point, and by interconnecting the limit switch 339 to a control module 26 suitably programmed to provide acceleration-deceleration control, the unit 10 is adapted to provide the desired result. In this regard, reference may be had to the co-pending application of Gordon M. Sommer, previously incorporated herein by reference, for a disclosure of a control system which may be advantageously utilized in conjunction with the drive unit 12. Moreover, since the piston 338 must be reversed at the end of its stroke, a second limit switch 337 is provided for actuating a four-way valve 326. In a like manner an additional pair of switches (not shown) may be provided at the opposite end of the cylinder 336.

The four-way valve 326 is preferably of the type employing a three position valve spool having a center position normally blocking fluid communication between the pump 320 and the double acting cylinder 336, and an operating position on opposite sides of the center position for selectively communicating the discharge side of the pump 320 via the conduit 322 and 328 to either of the conduits 340 and 342, respectively. The valve further includes spring means (not shown) located on opposite sides of the spool for normally shifting the valve spool to the center position, and can include a hydraulically actuated, pilot valve for controlling the operation of the spool. As shown in FIG. 4, the arrangement is indicated schematically, with the arrows on opposite sides of the center portion indicating the direction of flow of the pressurized fluid in accordance with the selective position of the valve spool. With reference thereto it will be seen that in the center position, the discharge side of the pump 320 is normally fluidly communicated to the suction side of the pump 320 via the conduit 332 and 328 and fluid communication is blocked relative to opposite sides of the piston 388 to obviate any tendency to drift.

In a typical operation of an automation device, for example, bi-directional movement may be provided by directly operating the devive from a hydraulic cylinder. For illustration, assume it is desired to make the cylinder respond to start, accelerate, decelerate, and stop, sequence. This is accomplished by controlling the operation of the fixed displacement pump 320. More particularly, the sequence is initiated in the control module 26 by a "start" command. In response to the "start" command the four-way valve shifts, and the variable speed drive unit 10 accelerates the pump 320 under programmed control to a preset full speed. Near the end of the stroke of the piston 338, the limit switch 339 provides a suitable signal to the programmed control module whereby the module commands "deceleration," and the brake in the variable speed drive unit 10 decelerates the pump under programmed control to a preset low speed. At the end of the stroke of the piston member 338, as determined by the limit switch 337, the module commands "stop" and the brake is fully applied on the variable speed drive 10, thereby stopping the pump 320 and the four-way valve 326 is deactivated. The valve 320, being spring loaded, then shifts the valve spool to the center position blocking the cylinder ports. Preferably, the module is responsive to some preselected maximum system pressure on the discharge side of the pump 320. If the maximum system pressure is reached due to a jam or improperly set limit switches, the pump 320 stalls and the pressure switch 330 may be adapted to stop the variable speed drive unit 10. On the other hand, if the pressure switch 330 fails, or is improperly set, and a stall continues, a thermal switch can be provided on the servo valve 30 for disconnecting the pump when the oil temperature reaches a preselected maximum temperature.

Figure 5:
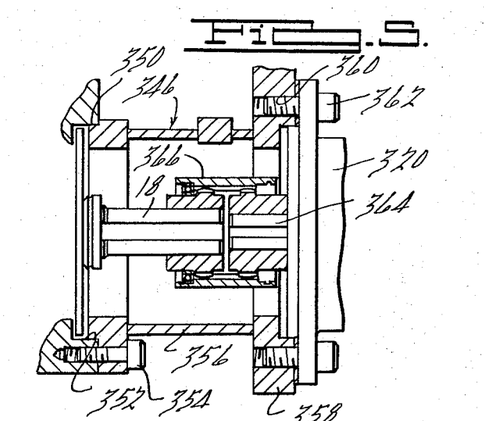
FIG. 5 is a cross-sectional plan view of an adapter assembly for connecting a fixed displacement pump to the output shaft of the variable speed drive unit illustrated in FIG. 2.
Figure 6:
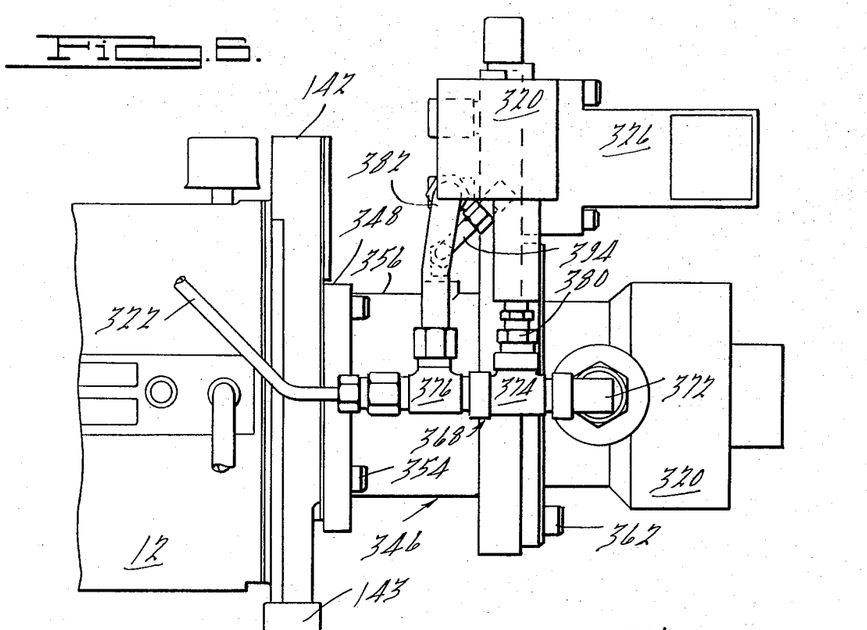
FIG. 6 is a side elevational view of the fixed displacement pump connected to the output shaft of the variable speed drive illustrated in FIG. 2.
Figure 7:
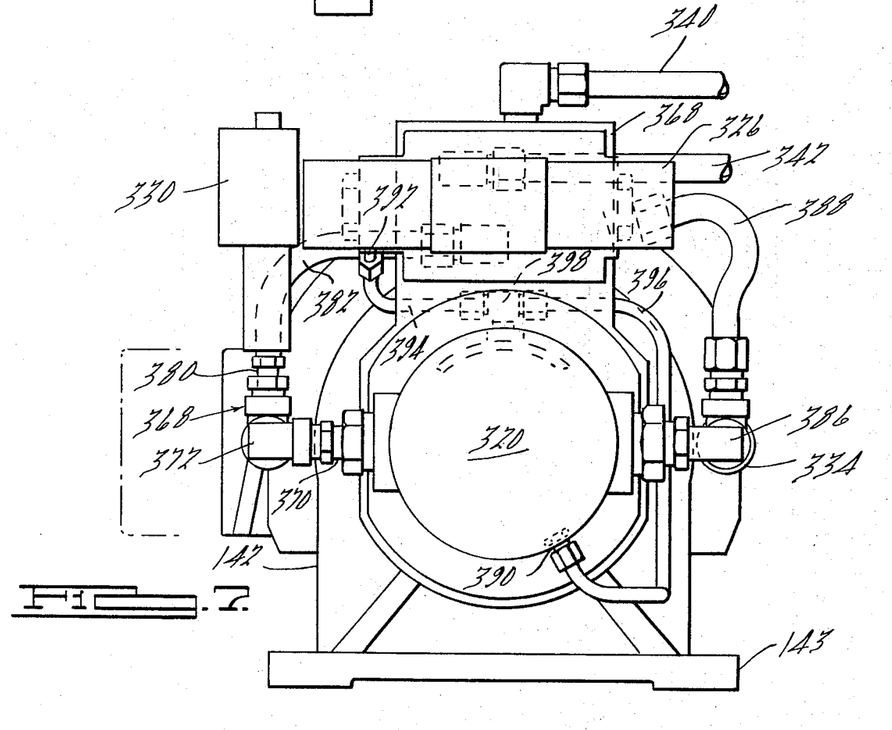
FIG. 7 is an end view of the side elevational view illustrated in FIG. 6.

An exemplary mounting and piping arrangement for adapting the variable speed drive unit 10 to the fixed displacement pump 320 is illustrated in FIGS. 5, 6 and 7. In FIG. 5, an adapter assembly 346 is flange mounted between the end housing 142 of the clutch-brake unit 12 and the fixed displacement pump 320. The adapter assembly 346 is comprised of flange members 348 and 358, respectively connected to the end housing 142 and pump 320 by suitable screws, bolts or the like 354 and 362. The flange 348 has a raised face 350 which engages the housing 142 and the flanges are suitably spaced by a sleeve 356. The output shaft 18 of the clutch-brake unit 12 is drivingly connected to the driven shaft 364 of the pump 320 by a flexible coupling 366. The flange 358 further includes an upwardly extending section 368 forming a suitable bracket for mounting the four-way valve 326. The discharge side of the fixed displacement pump 320 is connected to the conduit 322 via a piping manifold 368, which includes a reducer 370, an elbow 372, and first and second Tee members 374 and 376, respectively. The pressure switch 330 is supported on a riser 378 defined by a pipe reducer 380, and the branch connection of the Tee 376 provides pilot pressure to the four-way valve 326 via a conduit 382. The suction side of the fixed displacement 320 is connected to the four-way valve 326 via a threaded reducer 384, an elbow 386, and a Tee 388 (not shown) having a through bore mounted and fluidly connected to the shut-off valve 334. The branch line of the Tee 386 is connected to the four-way valve 326 via a conduit 388 to selectively transmit fluid pressure to the double acting cylinder 336 via the discharge lines 340 and 342, respectively.

In the subject invention, the hydraulic pump 32 provides makeup oil for the pump 320 and the valve 326. To accomplish this function the plurality of closure plugs 242 (see FIG. 2) are removed to fluidly communicate the interior of the housing 42 to the assembly 346. The external drain ports 390 and 392 of the fixed displacement pump 320 and the four-way valve 326 respectively, are connected and in fluid communication with the interior of the adapter assembly 346 via conduits 394, 396, and a Tee 398. Thus, makeup liquid for both the pump 320 and the four-way valve 326 is readily provided by the servo pump 32. Prior to operation of the fixed displacement pump 320, the piping system is precharged to a hydraulic pressure of approximately 30 psi by connecting the shutoff valve 334 to a suitable source of pressurized liquid and purging the complete piping system free of air. After precharging, the system may be operated in accordance with the procedure described in conjunction with FIG. 4.

As noted in the exemplary operational sequence of the fixed displacement pump 320, the variable speed drive 12 accelerates and decelerates the output shaft 18 in response to a suitably programmed control module 26. Generally speaking, however, acceleration and deceleration control may also be effectively utilized in such applications, for example, as stamping presses, balancing machines, and for jogging options on machine tools. To accelerate the output shaft 18, the friction in the clutch disc stack is increased by increasing the clamping force. The clamping force is applied by the actuating piston 228 in response to the magnitude of pressure in the working cylinder 245. Since this pressure is increased or decreased by the servo valve 30 in response to the output signal of the control module 26, it will be noted that the rate of speed change of the output shaft 18 can be controlled in accordance with a suitable speed reference programmed in the control module 26. Correspondingly, in a like manner, deceleration can also be provided by controllably modulating the clamping pressure applied to the brake disc stack. Thus, the variable speed drive unit 12 of the subject invention is extremely flexible in operation and is easily adapted to provide variable speed but also preselected acceleration and deceleration control.

While it will be apparent that the preferred embodiment of the variable speed drive unit illustrated herein, and the exemplary application, is well calculated to fulfill the objects above stated, it will be appreciated that the present invention is susceptible to modification, variation and change without departing from the proper scope or fair meaning of the subjoined claims.

What is claimed is:

1. A variable speed unit comprising: a housing defining a fluid reservoir;
   a shaft at least partially located in the reservoir and comprising first and second shaft sections;
   a series of radially disposed clutch plates mounted in said reservoir for rotation with said first shaft section;
   a series of friction discs carried by said second shaft section for rotation therewith, and adapted for selective frictional engagement with said clutch plates;
   actuating means located in said housing for selectively compressing said plates and said discs;
   a source of pressurized hydraulic fluid;
   control circuit means providing an output signal in accordance with a desired rotary motion of said second shaft section; and
   a hydraulic circuit operatively coupling said source of pressurized hydraulic fluid with said actuating means and including a valve means responsive to said output signal; said hydraulic circuit defining a first hydraulic output circuit via which hydraulic fluid from said source is applied to said actuating means and the pressure thereof is modulated by said valve means in accordance with said output signal for selectively modulating the pressure loading of said plates and discs, whereby said second shaft section is rotated in accordance with said desired rotary motion, said hydraulic circuit also defining a second output circuit via which at least a portion of pressurized hydraulic fluid from said source is discharged onto said series of plates and said series of discs.

2. The unit as recited in claim 1 further comprising a pulse gear mounted for rotation with one of said shaft sections, and magnetic pick-up means disposed proximate said gear for providing a feedback signal to said control circuit means.

3. The unit as recited in claim 2 wherein the output signal for said circuit means is adjusted in accordance with said feedback signal.

4. A variable speed drive of the viscous shear type adapted for selectively driving a driven machine from a constant speed motor, the drive comprising:
a housing assembly defining a fluid reservoir;
an input shaft rotatably supported by said assembly and drivingly connected to said motor;
an output shaft rotatably supported by said assembly and at least partially located in said reservoir;
a plurality of clutch plates located in said reservoir and supported for rotation with said input shaft;
a series of friction discs carried by said output shaft for rotation therewith;
actuating means in said housing selectively positionable for clampingly compressing said clutch plates with said series of friction discs;
piston means connected to said actuating means for effecting movement thereof;
pressurized hydraulic fluid means acting on one side of said piston means for selectively positioning said actuating means; and
control means for controlling the magnitude of pressure of said fluid means applied to said piston means and correspondingly the degree of compression relative to said clutch plates and said series of friction discs, said control means including a control circuit providing a variable output signal in accordance with a preselected output shaft angular speed and relief valve means responsive to said output signal for modulating the hydraulic pressure applied to said piston means in accordance with said output signal; and a hydraulic fluid path from said relief valve to said clutch plates and said friction discs via which fluid from said pressurized hydraulic fluid means is discharged onto said plates and discs.

5. The variable speed drive as recited in claim 4 wherein said assembly includes a plurality of ribs, and wherein said drive further comprises air circulating means for directing air movement across said ribs.

6. The variable speed drive as recited in claim 5 wherein said air circulating means includes a fan drivingly connected to one of said input and output shafts.

7. A variable speed drive of the viscous shear type adapted for selectively driving a driven machine from a constant speed motor, the drive comprising:
a housing assembly defining a fluid reservoir and including a plurality of ribs; an input shaft rotatably supported by said assembly and drivingly connected to said motor;
an output shaft rotatably supported by said assembly and said input shaft, and at least partially located in said reservoir;
air circulating means including a fan drivingly connected to one of said input and output shafts for directing air movement across said ribs;
a shroud connected to said assembly and at least partially surrounding said fan for directing air movement across said ribs;
a plurality of clutch plates located in said reservoir and supported for rotation with said input shaft;
a series of friction discs carried by said output shaft for rotation therewith;
actuating means operatively supported by said output shaft and positionable for selectively clampingly compressing said clutch plates with said series of friction discs;
piston means connected to said actuating means for effecting movement thereof;
pressurized hydraulic fluid means acting on one side of said piston means for selectively positioning said actuating means; and
means for controlling the magnitude of said fluid means and correspondingly the degree of compression relative to said clutch and said series of friction discs while simultaneously supplying said fluid means to said plates and discs for cooling.

8. The variable speed drive as recited in claim 7 wherein said pressurized fluid means includes a pump mounted on said shroud and drivingly connected to one of said input and output shafts.

9. The variable speed drive as recited in claim 8 further comprising a fluid media located in said reservoir, and first fluid conduit means connected to said reservoir and said pump for transferring said fluid media therebetween.

10. The variable speed drive as recited in claim 9 further comprising second fluid conduit means connected to said pump and said piston means for transferring said fluid media therebetween.

11. The variable speed drive as recited in claim 10 wherein said control means includes valve means connected between said second conduit means and said reservoir for providing a variable restriction whereby to control the pressure acting on one side of said piston means.

12. A variable speed drive of the viscous shear type and adapted for selectively driving a driven machine from a constant speed motor, the drive comprising:
a housing assembly defining a fluid reservoir;
water jacket means formed by said assembly for transferring heat from said drive unit;
an input shaft rotatably supported by said assembly and said input shaft, and at least partially located in said reservoir;
a plurality of clutch plates located in said reservoir and supported for rotation with said input shaft;
a series of friction discs carried by said output shaft for rotation therewith;
actuating means operatively supported by said output shaft and positionable for selectively clampingly compressing said clutch plates with said series of friction discs;
piston means connected to said actuating means for effecting movement thereof;
pressurized hydraulic fluid means acting on one side of said piston means for selectively positioning said actuating means; and
means for controlling the magnitude of said fluid means and correspondingly the degree of compression relative to said clutch and said series of friction discs while simultaneously supplying said fluid means to said plates and discs for cooling.

13. The variable speed drive as recited in claim 12 which includes a plurality of circumferentially spaced fin means for increasing the surface area therein.

* * * * *